US008749383B2

(12) United States Patent
Vijayaraghavan et al.

(10) Patent No.: US 8,749,383 B2
(45) Date of Patent: Jun. 10, 2014

(54) METHOD OF NEIGHBORHOOD WATCH IMPLEMENTED IN-PART WITH ELECTRONIC SURVEILLANCE SYSTEM

(75) Inventors: Niranjan Vijayaraghavan, Thanjavur (IN); RajeshKumar Rajendran, Nagercoil (IN); Manikandan Ramaswami, Sirkali (IN); SatishKumarPandian Sakthivel, Rajapalyam (IN)

(73) Assignee: Honeywell International Inc., Morristown, NJ (US)

( * ) Notice: Subject to any disclaimer, the term of this patent is extended or adjusted under 35 U.S.C. 154(b) by 525 days.

(21) Appl. No.: 13/177,174

(22) Filed: Jul. 6, 2011

(65) Prior Publication Data

US 2013/0009749 A1 Jan. 10, 2013

(51) Int. Cl.
*H04M 11/04* (2006.01)

(52) U.S. Cl.
USPC ........... 340/541; 340/506; 340/531; 340/540; 455/404.1; 455/521; 455/507; 455/517; 348/43; 348/152; 348/153

(58) Field of Classification Search
CPC ...... G08B 25/016; G08B 25/00; G08B 27/00; G08B 27/003; H04L 12/1895; H04L 12/18; H04W 4/06; H04W 68/00
USPC ............... 340/506, 531, 540, 541; 455/404.1, 455/521, 507, 517; 348/43, 152, 153
See application file for complete search history.

(56) References Cited

U.S. PATENT DOCUMENTS

| | | | | |
|---|---|---|---|---|
| 2003/0184436 | A1* | 10/2003 | Seales et al. | 340/531 |
| 2006/0103520 | A1* | 5/2006 | Clark | 340/506 |
| 2006/0234672 | A1* | 10/2006 | Adler | 455/404.1 |
| 2007/0133356 | A1* | 6/2007 | O'Connor | 368/243 |
| 2009/0138336 | A1* | 5/2009 | Ashley et al. | 705/10 |
| 2011/0058034 | A1* | 3/2011 | Grass | 348/143 |
| 2011/0211069 | A1* | 9/2011 | Sybesma | 348/143 |
| 2012/0092161 | A1* | 4/2012 | West | 340/540 |
| 2012/0257061 | A1* | 10/2012 | Edwards et al. | 348/153 |

* cited by examiner

*Primary Examiner* — Andrew Bee
(74) *Attorney, Agent, or Firm* — Husch Blackwell LLP

(57) ABSTRACT

A regional surveillance system includes a plurality of local geo-tagged surveillance systems each of which is associated with a predetermined virtual neighborhood. The surveillance systems wirelessly communicate alarm or incident indicating messages, along with neighborhood defining indicia to a common control unit. The common control unit evaluates the incoming messages, and responsive to predetermined criteria, determines which members of a plurality of subscribers should be notified by an alarm or incident indicating message. Once the appropriate subscribers receive the message(s) then a determination can be made as to which, if any, non-subscribers should be notified.

20 Claims, 2 Drawing Sheets

METHOD OF NEIGHBORHOOD WATCH IMPLEMENTED IN-PART WITH ELECTRONIC SURVEILLANCE SYSTEM

FIELD

The application pertains to regional monitoring to provide improved security to a subscriber group. More particularly, it pertains to defining a virtual neighborhood via geo tagging each one of a plurality of local security, or surveillance, systems which can in turn forward messages, alarms, to a common control unit for selective dissemination to subscribers.

BACKGROUND

A neighborhood watch, or crime watch, includes an organized group of citizens devoted to preventing crime and vandalism within a neighborhood. This activity requires dedicated people and their time. Electronic surveillance systems installed in individual premises will prevent crime and vandalism only for the individual premises, not the neighborhood.

It would be desirable to address a broader region which might include one or more premises. Preferably existing surveillance systems could be used in a broader context to support preventing crime or vandalism in a neighborhood.

DETAILED DESCRIPTION

Figure 1:
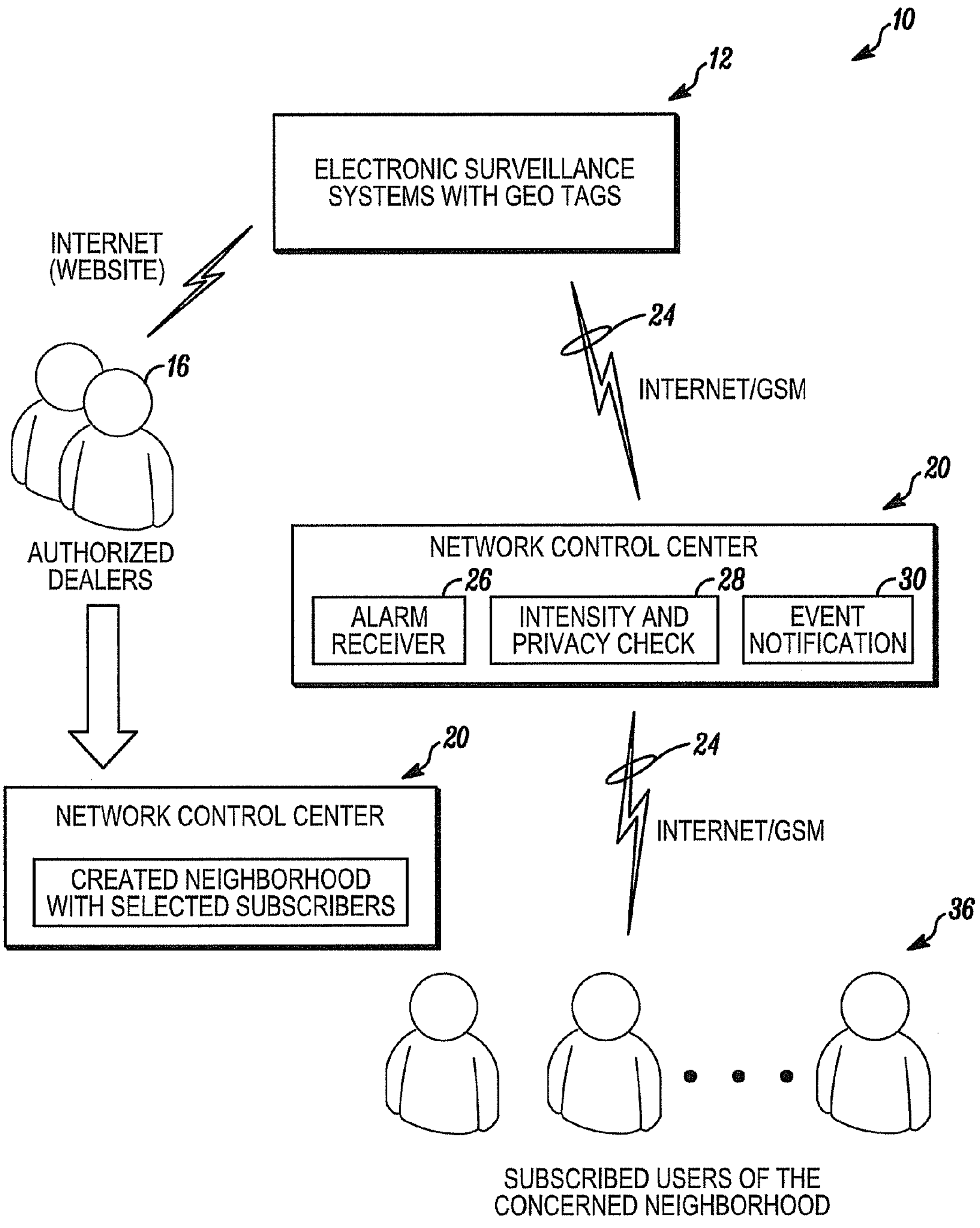
FIG. 1 is a block diagram illustrating aspects of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Disclosed embodiments couple output messages, or alarms from electronic surveillance systems scattered throughout a virtual neighborhood through a network control center to benefit the neighborhood or an organized group of subscribers to prevent crime and vandalism.

Electronic surveillance systems can forward criminal or vandalism indicating messages, or events, to subscribers, or responders, through the network control center. Information from a plurality of electronic surveillance system and alarms from the surveillance system is managed by the network control center. Geo tagged surveillance systems can be grouped through the network control center. Criminal or vandalism indicting events detected by the surveillance systems will be shared across the group to prevent crime or vandalism within an organized, virtual, neighborhood.

Alarms can be shared based on the settings in surveillance systems. Surveillance systems can forward events or alarms to one or more organized groups based on suspicious activities with in the neighborhood. The surveillance area for the neighborhood can be geo fenced through a map based solution. All electronic surveillance systems managed by the network control system with geo tags within that range will be grouped for a neighborhood watch implemented in part with that plurality of electronic surveillance systems.

Neighborhood watch with electronic surveillance systems will also help the local group by providing regional alarms relative to life critical threats like fire or toxic gas attacks. The members of the group can be warned of the seriousness of the approaching life threat. The neighborhood watch system and method described here will work through the network control center. All of the electronic surveillance systems are grouped through the network control center.

Neighborhood watch is an integral part of the tagged, neighborhood electronic surveillance systems. The first step in implementing the neighborhood watch includes registering and tagging the electronic surveillance systems with the network control system. The neighborhood watch initiation can be implemented through an authorized dealer network supported by the Network Control Center. Defining the area for a requested, virtual, neighborhood and enabling tagging the surveillance systems as being in the neighborhood is part of the dealer's job.

A dealer will be provided a map based solution to define the neighborhood. Once a dealer geo fences the neighborhood, all the electronic surveillance systems within the geo fence will be listed for selection. The defined neighborhood can be updated with additions and deletes. The neighborhood related notifications are based on the settings in an individual electronic surveillance system. Surveillance system owner notifications can be provided with a higher priority than neighborhood notifications.

Surveillance systems in the neighborhood can be identified with individual geo tags. Signals or information from surveillance systems in the neighborhood are coupled to the network control center. The center, after determining that a given surveillance system is in a defined neighborhood, can respond to messages, or alarms, carry out privacy checks, and issue event notifications to subscribers, 1 . . . n in the neighborhood. Also, surveillance system owners can manually raise events or alarms between organized groups based on suspicious activities seen within a neighborhood.

With respect to FIG. 1, a neighborhood watch system 10 includes a plurality of electronic surveillance systems 12. The members of the plurality 12 have been marked with Geo Tags. The Tags identify the members of the plurality 12 within the virtual boundaries of the neighborhood.

One or more authorized dealers 16 can assist in tagging the members of the plurality 12 Communications between the dealers 16 and the surveillance systems in the plurality 12 can, for example be wireless via a local Wi-Fi, or Internet, communications system.

The dealers 16 can provide information to a network control center 20, during initial set-up, or subsequently, as to members of the plurality 12 which have been Geo Tagged and identified as part of a defined neighborhood. Different groups of authorized dealers can establish a plurality of Geo Tagged neighborhoods, some of which might overlap one another. In some circumstances, a given system might be identified as being part of two or more neighborhoods.

Subsequently, the members of the plurality 12 can individually, and wirelessly, or via wired links, for example Internet/GSM, communicate, alarm or incident indicating messages, along with their respective Geo Tag, as indicated at 24 to the control center 20. Communications can be implemented via a cellular Internet/GSM type system, without limitation.

The control center 20 can include an alarm message receiver 26 which responds to those messages or incident reports that are associated with one or more pre-defined neighborhoods of which the center 20 is aware. Message type, and situation seriousness can be evaluated, as at 28 along with carrying out a privacy check. The privacy check can take into account the preferences as to notices to be sent to the owners of the systems 12, or the subscribers to be notified.

Event notification, as at 30, can be carried out using the communications network 24 to provide messages to members, or subscribers 36 of the virtual neighborhood defined by the systems 12. Subscribers 36, members of the community, can be informed as to incident related messages from some or all of the members of the plurality 12, consistent with privacy policy 28.

Thus, some alarm or incident messages from members of the plurality 12 might be shared with all members of the plurality 36. On the other hand, based on the neighborhood privacy policy relative to one subscriber or another, some of the notifications might be communicated to only a subset of the subscribers 36. The extent of communication of messages is something that could be established individually by members of the plurality 36.

Figure 2:
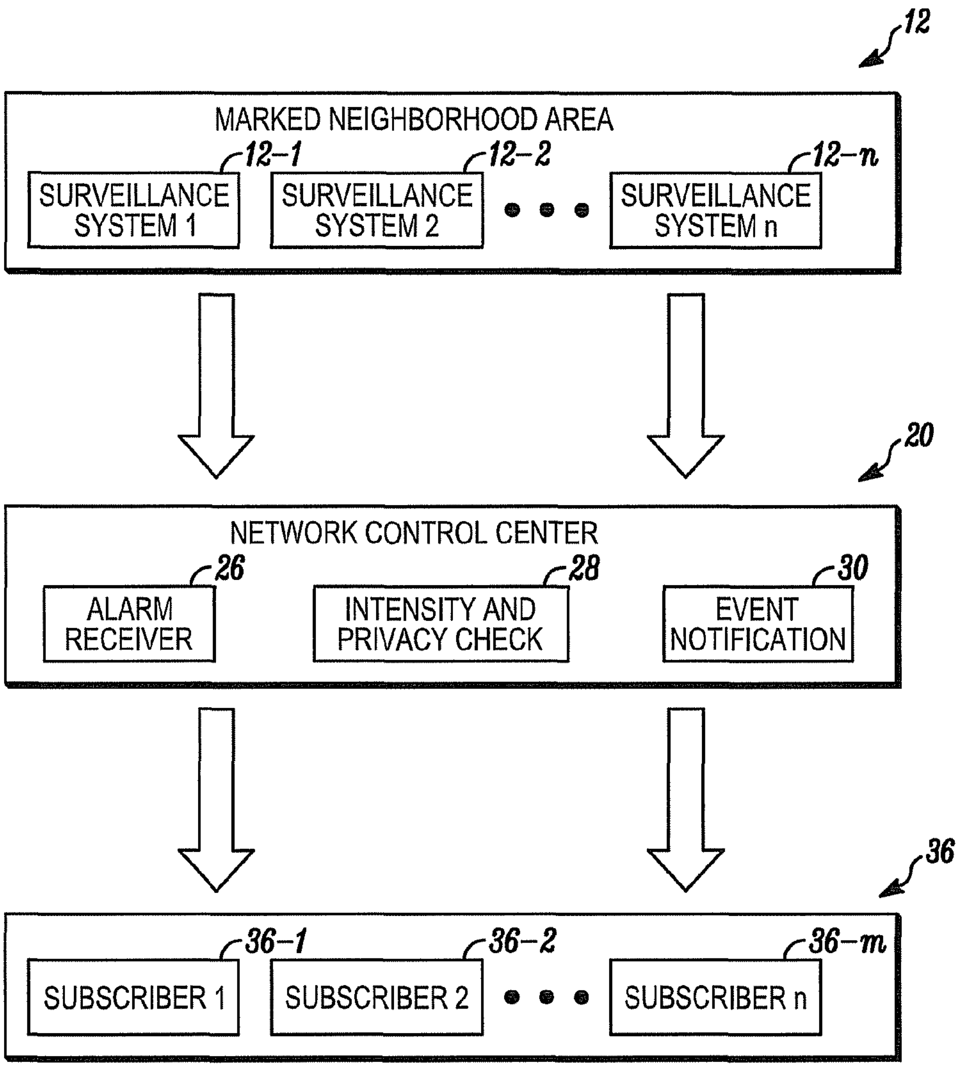
FIG. 2 is another block diagram illustrating additional aspects of the system of FIG. 1.

As illustrated in FIG. 2, surveillance systems 12-1, 12-2 . . . **12-*n* (which could be different from one another) are able to communicate with the control center 20 and forward alarm or incident messages, tagged as being part of a pre-defined neighborhood. The messages can be evaluated as appropriate, based on subscriber privacy policies. Notifications, or messages, can be forwarded to some or all of the subscribers 36-1, 36-2 . . . 36-*m*. It will also be understood that alarm related, or incident related, information can be provided selectively via the control center 20** to non-subscribers in a selected neighborhood but with a lower priority. Subscribers would receive messages with the highest priority.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method of regional surveillance comprising:
- assigning each member of a plurality of local surveillance systems an identification tag specifying a selected neighborhood;
- providing a common control system with which each of the surveillance systems can communicate;
- providing wireless communications between the members of the plurality and the common control system;
- detecting an incident at one of the members of the plurality, and, transmitting an incident indicating message to the common control system along with the respective identification tag;
- evaluating the message at the control system; and
- responsive to the evaluating, broadcasting an incident specifying report to a predetermined group of recipients.

2. A method as in claim 1 wherein evaluating includes determining the members of the group of recipients based on at least one of predetermined incident seriousness or privacy criteria.

3. A method as in claim 2 where broadcasting includes broadcasting to a predetermined group of subscribers.

4. A method as in claim 3 where broadcasting includes broadcasting to a group of non-subscribers, subsequent to broadcasting to the predetermined group of subscribers.

5. A method as in claim 1 which includes establishing a virtual boundary for the selected neighborhood.

6. A method as in claim 5 which includes establishing a plurality of subscribers.

7. A method as in claim 6 wherein evaluating includes determining the members of the group of recipients based on predetermined incident seriousness and privacy criteria.

8. A method as in claim 7 where broadcasting includes broadcasting to the predetermined group of subscribers.

9. A method as in claim 8 where broadcasting includes broadcasting to a group of non-subscribers, subsequent to broadcasting to the predetermined group of subscribers.

10. A method as in claim 1 which includes establishing a virtual boundary for the selected neighborhood.

11. A method as in claim 10 which includes establishing the members of the plurality of surveillance systems from among those in a larger plurality which comes within the neighborhood.

12. A method as in claim 11 which includes establishing the members of the plurality of subscribers from a larger plurality of potential subscribers.

13. A regional surveillance system comprising:
- a plurality of local surveillance systems, wherein each of the local systems is geo tagged as part of a predetermined neighborhood;
- a common network control center which is in wireless communication with members of the plurality, the common center includes at least one programmable processor and associated, pre-stored, control software which, when the processor executes the control software, can evaluate incoming messages from members of the plurality in accordance with pre-stored criteria, where the incoming messages include the geo-tags of the members of the plurality, and where the common center includes pre-stored identifiers of members of a plurality of subscribers, associated with the neighborhood; and
- a wireless communication system linking the surveillance systems to the common center, and the common center to at least the subscribers; and
- where the common control center includes circuitry to broadcast to at least some of the members of the plurality of subscribers, incident specifying reports responsive to the evaluated messages.

14. A regional system as in claim 13 where the network control center includes a user interface to establish a plurality of different geo-identified neighborhoods.

15. A regional system as in claim 14 where the network control center includes a data storage unit that stores neighborhood identification information, and message evaluation criteria.

16. A regional system as in claim 15 where the common control center evaluates received, incident related information from members of the plurality of surveillance systems, in response to the stored neighborhood identification information, and message evaluation criteria.

17. A regional system as in claim 16 where a plurality of subscribers can be specified using the user interface, and stored in the data storage unit.

18. A regional system as in claim 17 where the circuitry to broadcast, broadcasts incident related information in accordance with the message evaluation criteria.

19. A regional system as in claim 18 where the message evaluation criteria includes message types and selected privacy considerations.

20. A regional system as in claim 19 where in response to the privacy considerations, only selected subscribers receive privacy limited messages.

* * * * *

UNITED STATES PATENT AND TRADEMARK OFFICE

CERTIFICATE OF CORRECTION

PATENT NO. : 8,749,383 B2
APPLICATION NO. : 13/177174
DATED : June 10, 2014
INVENTOR(S) : Niranjan Vijayaraghavan et al.

It is certified that error appears in the above-identified patent and that said Letters Patent is hereby corrected as shown below:

On the title page, item (75) Inventors:
Change "SatishKumarPandian Sakthivel" to -- SathishKumarPandian Sakthivel --.

Signed and Sealed this
Twenty-first Day of October, 2014

Michelle K. Lee
*Deputy Director of the United States Patent and Trademark Office*